United States Patent [19]

Onishi et al.

[11] Patent Number: 5,121,056
[45] Date of Patent: Jun. 9, 1992

[54] PULSE GENERATOR FOR USE IN A SPEED SENSOR

[75] Inventors: Masayoshi Onishi; Hisato Umemaru, both of Himeji, Japan

[73] Assignee: Mitsubishi Denki K.K., Tokyo, Japan

[21] Appl. No.: 514,477

[22] Filed: Apr. 25, 1990

[30] Foreign Application Priority Data

Apr. 26, 1989 [JP] Japan .................. 1-49282[U]
Apr. 26, 1989 [JP] Japan .................. 1-49283[U]
Apr. 26, 1989 [JP] Japan .................. 1-49284[U]

[51] Int. Cl.$^5$ .................. G01B 7/30; G01P 3/481
[52] U.S. Cl. .................. 324/207.15; 324/174
[58] Field of Search .................. 324/207.15, 207.25, 324/207.26, 173, 174, 239, 262; 439/453, 455, 83, 878, 888, 686, 733, 739; 336/100, 105, 107, 192, 196, 198

[56] References Cited

U.S. PATENT DOCUMENTS

| 1,875,241 | 8/1932 | Idank | 439/888 |
| 3,910,666 | 10/1975 | McIntosh | 439/878 X |
| 4,096,735 | 6/1978 | Huntzinger et al. | 73/35 |
| 4,829,245 | 5/1989 | Echasseriau et al. | 324/174 |
| 4,853,575 | 8/1989 | Lessig, III | 324/174 X |
| 4,888,551 | 12/1989 | Hata et al. | 324/174 X |
| 4,912,448 | 3/1990 | Katayama et al. | 439/888 X |
| 4,931,728 | 6/1990 | Hata et al. | 324/174 X |

Primary Examiner—Kenneth A. Wieder
Assistant Examiner—Warren S. Edmonds
Attorney, Agent, or Firm—Sughrue, Mion, Zinn, Macpeak & Seas

[57] ABSTRACT

The invention is directed to a pulse generator provided with a connecting member electrically connecting the lead and coil having an entwining section at one end thereof at the portion different from where an end of the coil is fixed, around which wound the middle portion of the coil drawn out to be connected to the lead, whereby a stress added to the drawn out coil is absorbed by the coil twined around the entwined portion, to be prevented from cutoffs of the coil fixed to the one end of the connecting member. A reinforcing member can be applied to the connecting member at an end thereof where the coil is fixed, to reinforce the bending strength of the end portion of the connecting member thereby to prevent cutoffs of the coil. Furthermore, the pulse generator may be provided with a bobbin having a protrusion at the edge of one flange thereof the drawn out coil twining around thereby to maintain the winding strength of the coil to facilitate the following work. In addition, the drawn out coil is prevented from being rubbed by the edge of the flange to be cut off.

4 Claims, 7 Drawing Sheets

PULSE GENERATOR FOR USE IN A SPEED SENSOR

BACKGROUND OF THE INVENTION

1. Field of the Invention

This invention relates to a pulse generator for use in a speed sensor or the like.

2. Description of Related Art

FIG. 1 is a sectional view of a conventional pulse generator disclosed, for example, in Japanese Utility Model Application Laid Open No. 62-33986 (1987). The numeral 1 designates a casing of the pulse generator to cover a voltage generating coil 2 which is wound around the body of a bobbin 3 having flanges at both ends in the axial direction thereof and four leg portions. A magnetic core 4 penetrates the center of the body of the bobbin 3, with one end thereof protruding outside the casing 1. The protruding end of the core 4 is a detecting head 4a to detect an object to be detected, i.e., a gear (not shown) or the like passing through. The other end of the core 4 has a larger diameter than the other portions of the core 4, thereby stopping the magnetic core 4 to slip off from the bobbin 3. A bias magnet 5 is mounted in contact with the stopper portion of the core 4 and a spacer 6 to increase the magnetic flux. The bias magnet 5 and spacer 6 are placed inside the leg portions of the bobbin 3.

At an outer periphery of the leg portions of the bobbin 3 is provided a terminal 8 which connects the coil 2 with a lead 7 extending from the pulse generator to an external device. A starting end of the lead 7 is crimped by a crimping portion 8b at one end of the terminal 8. Another end portion of the terminal 8 is an entwined portion 8a where the end portion of the coil 2 wound around the bobbin 3 is entwined so as to fasten the coil 2. The entwined portion 8a the last end of the coil 2 fixed to by soldering is flexible. The coil 2 between the bobbin 3 and terminal 8 is rigidly secured and protected by tapes 9 at the position where the winding is finished and at the entwined portion 8a, respectively.

FIG. 2 is an enlarged plane view of the entwined portion 8a from the body of the bobbin 3 in the course of twining the end portion of the coil 2 therearound. FIG. 2 shows the state that the end portion of the coil 2 is twined round the entwined portion 8a which is raised approximately at right angles to the leg portions of the bobbin 3 and fixed to the entwined portion 8a by soldering. Then, the entwined portion 8a is stretched towards the bobbin 3. Accordingly, the coil 2 where it is finished winding is suitably loosened. The crimping portion 8b and the lead 7 are sealed in a mold member 10 which has leg portions 10a reaching inside the leg portions of the bobbin 3. The leg portions 10a press the spacer 6 and bias magnet 5 against the slip-preventing portion of the magnetic core 4 to fix them.

The pulse generator having the above-described structure operates as follows. When the gear (not shown) is rotating, with teeth thereof passing through the vicinity of the detecting head 4a, the magnitude of reluctance in a magnetic circuit formed by the edge of the gear, magnetic core 4 and a gap defined by the distance between these edge and core changes most, whereby the quantity of the magnetic flux crossing the coil 2 changes most and the pulse generator outputs the largest voltage. On the other hand, when a trough portion between the gear teeth passes through the vicinity of the detecting head 4a, the magnitude of reluctance in a magnetic circuit formed by the trough portion, magnetic core 4 and a gap defined by the distance between trough and magnetic core 4 changes least, whereby the quantity of the magnetic flux crossing the coil 2 changes least and the pulse generator outputs the smallest voltage. Accordingly, the output voltage of the pulse generator forms approximately a sine wave.

In the conventional pulse generator described above, when the entwined portion 8a is inclined in assembling, the coil 2 from the bobbin 3 to the terminal 8 is pressed back towards the terminal 8 because it is fixed by the tape 9 at the bobbin side thereof. As a result of this, a stress is applied to the solder joint, the joint being susceptible to breakage because of the solder being wet around the coil 2, resulting in the joint being broken causing cutoff of the thin coil.

Moreover, after the coil 2 is wound up around the bobbin 3, the finishing side of the coil 2 is fixedly bandaged with the tape 9 so as not to loosen. The winding tension of the coil disadvantageously slackens before bandaging the tape 9, thus making it difficult to fix the coil 2 by the tape 9. Further, a vibrating shock or the like during handling of the bobbin 3 in assembling the pulse generator or during use of the pulse generator cause cutoffs of the coil 2 by being rubbed at an edge of the flange of the bobbin 3.

SUMMARY OF THE INVENTION

This invention is intended to solve the above-described problems of the prior art, and it is a first object of this invention to provide a pulse generator having at least one section for twining a coil formed before a winding-end portion of a coil reaches the position to be fixed by soldering, whereby shock to the coil at the boundary between the coil and solder is absorbed thereby to prevent to coil from becoming cutoff.

It is a second object of this invention to provide a pulse generator wherein a reinforcing material is placed at an end portion of a terminal a last end of the coil twining around, thereby to prevent the end portion of the terminal from breaking when it is bent or stretched.

It is a third object of this invention to provide a pulse generator wherein a protrusion for twining a coil around is formed at an edge of a flange of a bobbin to fix the coil wound up around the bobbin, thereby to prevent the coil from cutoffs caused by rubbing at the edge of the flange as a result of vibrations, etc.

A fourth object of this invention is to provide a pulse generator wherein a protrusion is formed on a bobbin for twining an end portion of the coil wound up around the bobbin maintaining the winding tension, thereby to make it easy to bandage a tape to prevent the wound coil from slackening.

The above and further objects and features of the invention will more fully be apparent from the following detailed description with accompanying drawings.

DESCRIPTION OF THE PREFERRED EMBODIMENTS

A pulse generator of this invention will be discussed in detail hereinbelow with reference to the accompanying drawings.

Figure 3:
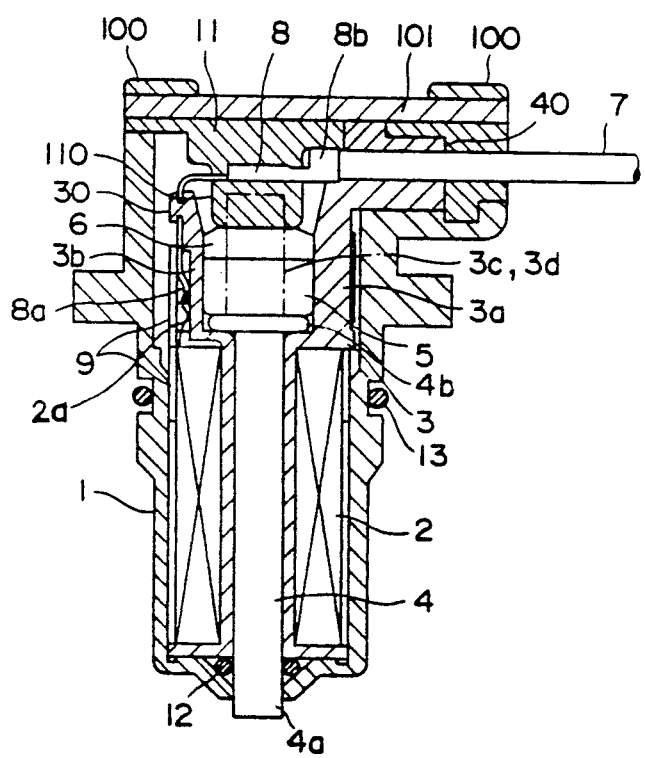
FIG. 3 is a sectional view of the structure of a pulse generator according to one embodiment of this invention.

Referring to FIG. 3, the structure of a pulse generator according to one embodiment of this invention is shown in a sectional view therein. The numeral 1 designates a casing to cover a resinous bobbin 3 with a body having flanges at both ends thereof in the axial direction and four leg portions 3a, 3b, 3c and 3d, and a voltage generating coil 2 wound around the body of the bobbin 3. A magnetic core 4 penetrates the center of the body of the bobbin 3, with one end thereof protruding outside the casing 1. The protruding end is a detecting head 4a to detect when an object to be detected, i.e., a gear or the like (not shown) passes therethrough. An O-ring 12 is fitted in the outer periphery of the magnetic core 4 between an end portion of the bobbin 3 and the casing 1. Since the other end 4a of the magnetic core 4 has a large diameter compared with the other portions of the core, the magnetic core 4 will not slip off from the bobbin 3. A bias magnet 5 is mounted in contact with stopper portion 4b and also with a spacer 6, which is provided to increase the magnetic flux. The bias magnet 5 and spacer 6 are provided inside the four leg portions 3a, 3b, 3c and 3d integrally formed with the bobbin 3.

A lead 7 runs through a hole penetrating a lead supporter 40 formed on an extension part of the leg portion 3a in the direction at right angles to the axis of the magnetic core 4, to reach an external device. The lead 7 is connected with the coil 2 by an L-shaped terminal 8 disposed to extend from an outer periphery of the leg portion 3b to an opening of the casing 1. The column of the L-shaped terminal 8 is a crimping portion 8b to crimp a starting end of the lead 7. A tip end of the leg of the terminal 8 is a bendable entwined portion 8a' where the last end 2a of the coil 2 around the bobbin 3 is entwined. The boundary portion between the entwined portion 8a' and crimping portion 8b is temporarily fixed to a fastening portion 30 thermally formed on the leg portion 3b of the bobbin 3. The last end 2a of the coil 2 twined around the entwined portion 8a' is fixed by soldering. The winding-end of the coil 2 is fixed by tapes 9 bandaged around the bobbin 3 and entwined portion 8a'.

The last end 2a of the coil 2 is twined around the entwined portion 8a' raised approximately at right angles to the leg portion 3b of the bobbin 3. After the last end 2a is fixed by soldering, the entwined portion 8a' is stretched towards the bobbin 3. Therefore, the coil 2 from the bobbin 3 to the terminal 8 is suitably loosened.

A grommet 11 having a protrusion 110 protruding inside the casing 1 in the center thereof is fitted in the opening of the casing 1 at the side of the leg portions 3a, 3b, 3c and 3d of the bobbin 3. The protrusion 110 abuts the spacer 6. The grommet 11 is covered with a plate 101, to which peripheral area is fitted an opening edge 100 of the casing 1 bent inward by heat. The protrusion 110 of the grommet 11 presses the spacer 6 and bias magnet 5 against the stopper portion 4b of the magnetic core 4, thereby preventing the spacer and magnet from shifting axially. There is an O ring 13 fitted around the outer periphery in approximately axial middle of the casing 1.

Figure 1:
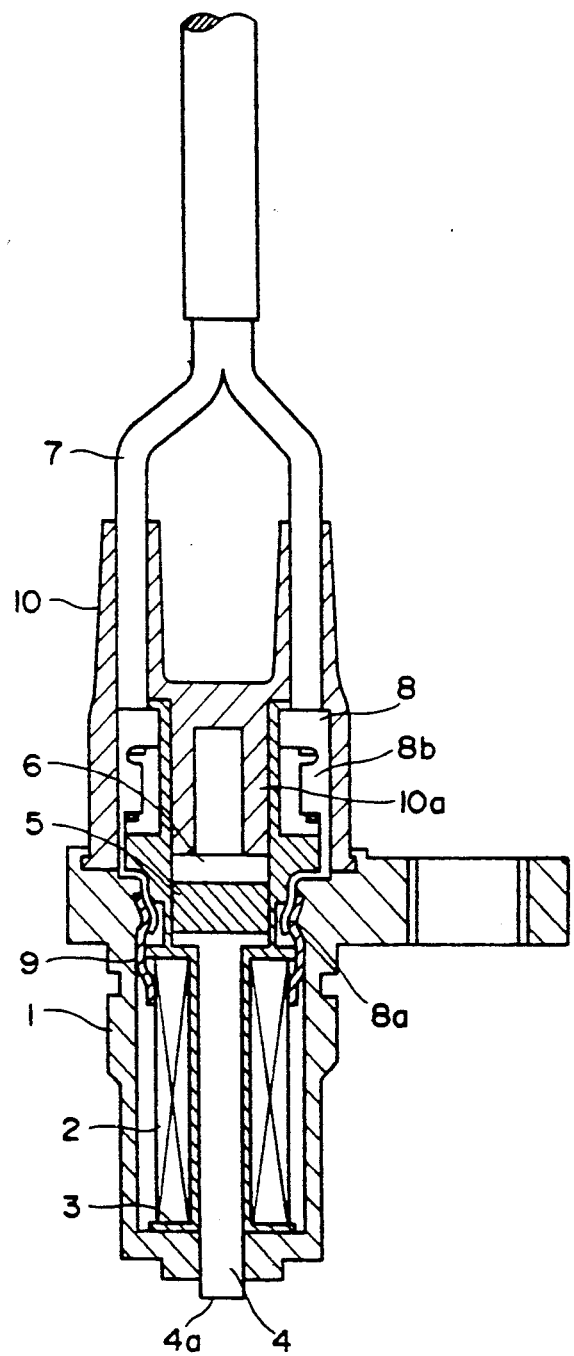
FIG. 1 is a sectional view of the structure of a conventional pulse generator.
Figure 2:
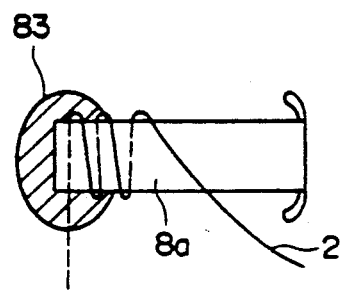
FIG. 2 is an enlarged view of an end portion of a terminal of the pulse generator of FIG. 1.
Figure 5:
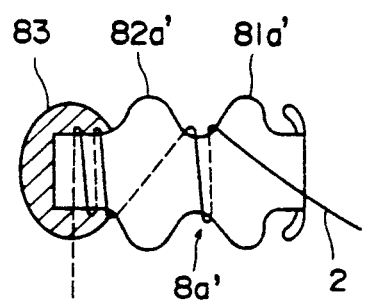
FIG. 5, FIG. 6 and FIG. 7 are enlarged plane view of an end portion of a terminal of the pulse generator.
Figure 6:
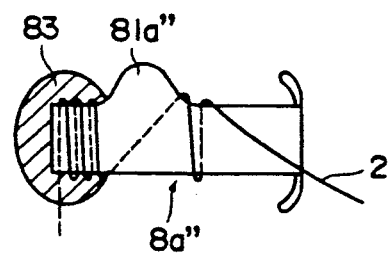
Figure 4:
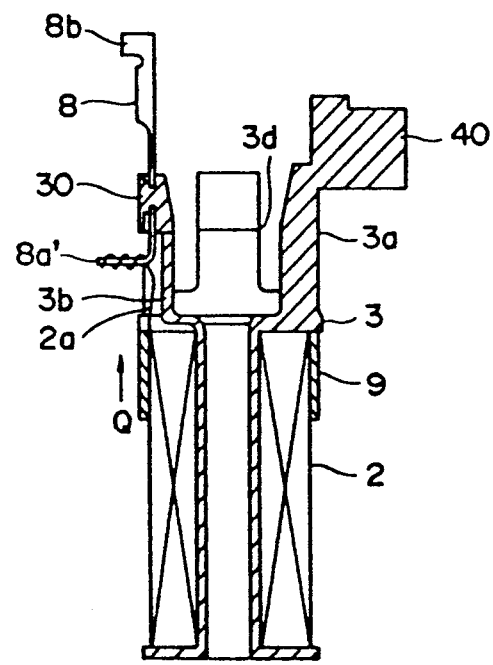
FIG. 4 is a partial sectional view of the pulse generator in assembling.
Figure 7:
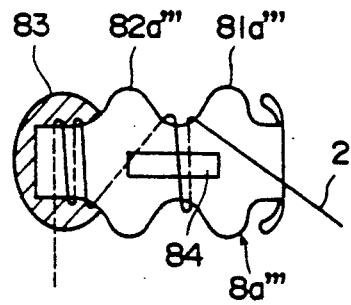
Figure 8:
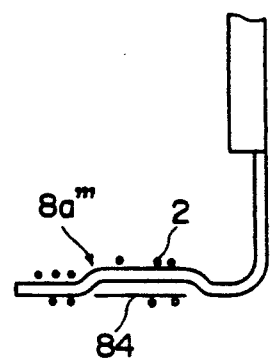
FIG. 8 is a sectional view of FIG. 7.

FIG. 4 is a partial sectional view of the pulse generator showing how the last end 2a of the coil 2 is twined around the entwined portion 8a' and fixed by soldering. FIGS. 5, 6 and 7 are enlarged views of the entwined section 8a', 8a'' and 8a''', respectively, seen from the direction Q of FIG. 4, and FIG. 8 is a sectional view of the entwined portion 8a''' shown in FIG. 7.

The entwined portion 8a' shown in FIG. 5 has two wide areas, namely, between where the coil 2 is fixed by a soldering paste 83 and where the entwined portion 8a' is bent. The coil 2 is twined around the position to be fixed by the soldering paste 83 after it is twined around a narrow boundary between the two wide areas 81a' and 82a'.

Meanwhile, the entwined portion 8a'' shown in FIG. 6 has one wide area between where the coil 2 is fixed by the soldering paste 83 and where the entwined portion 8a' is bent. After the coil 2 is twined around in front of the wide area 81a'', it is subsequently twined around the position to be fixed by the soldering paste 83.

Accordingly, when the entwined portion 8a' or 8a'' is stretched to the bobbin 3 thereby giving suitable slack to the winding-end of the coil 2, although the coil 2 is pressed back from the bobbin 3, the stress of the coil 2 is absorbed by the portion of the coil 2 entwined before it is entwined to be fixed by the soldering paste 83. Therefore, the stress is not transmitted to the portion of the coil fixed by the soldering paste 83. Hence, the coil is prevented from being cut-off.

In FIG. 7, the coil entwined portion 8a''' has two wide areas between where the coil 2 is twined to be fixed by the soldering paste 83 and where the entwined portion 8a''' is bent. As is understood from a sectional view shown in FIG. 8, a rectangular depression is formed in the central part across the wide areas 81a''' and 82a''', where a reinforcing rib 84 is fitted in for the purpose of reinforcing the bending strength of the narrow boundary between two wide areas 81a''' and 82a'''. After the coil 2 is twined round the narrow boundary between the wide areas 81a''' and 82a''', it is twined around the position where it is fixed by the soldering paste 83. Accordingly, when the coil entwined portion 8a''' is stretched to the bobbin 3 thereby to give suitable slack to the winding-end of the coil 2, the stress of the coil 2 pressed back from the bobbin 3 is absorbed by the portion of the coil entwined before it is fixed by the soldering paste 83, and therefore not transmitted to where it is fixed by the soldering paste 83. Thus, the coil 2 can be prevented from its cutoffs.

Also, because the narrow boundary between the wide areas 81a''' and 82a''' is never bent owing to the reinforcing rib 84 even when the entwined portion 8a''' is stretched to the bobbin 3, the coil 2 is never pulled from either entwined portions. Accordingly, it becomes possible to prevent cut-off of the coil 2.

Since the pulse generator of this invention operates in the same manner as the conventional one to produce pulses, the description thereof will not be included herein.

Figure 9:
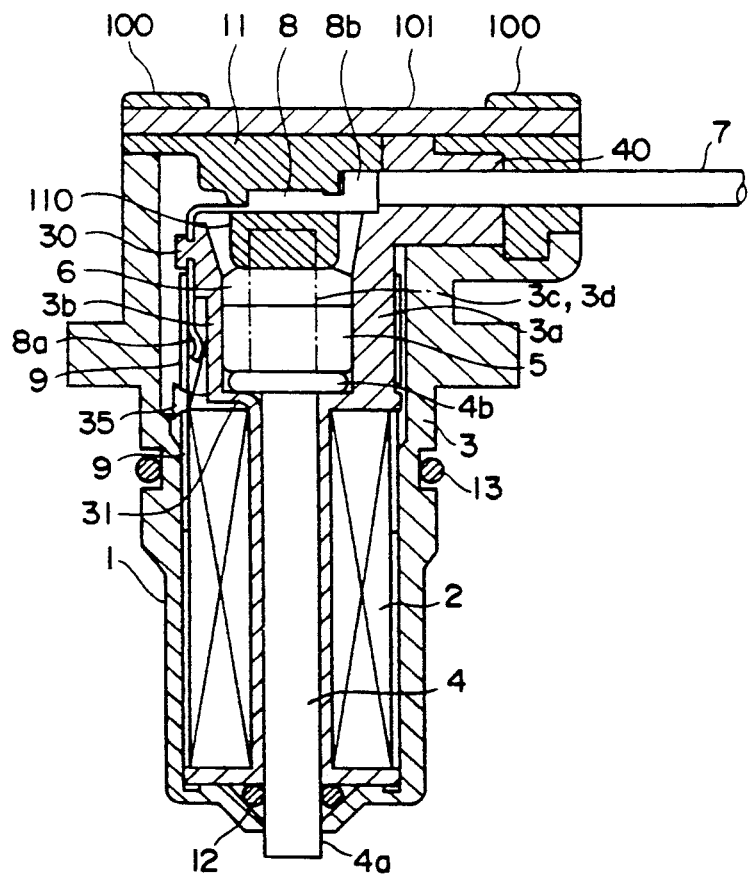
FIG. 9 is a sectional view of a pulse generator according to another embodiment of this invention.
Figure 10:
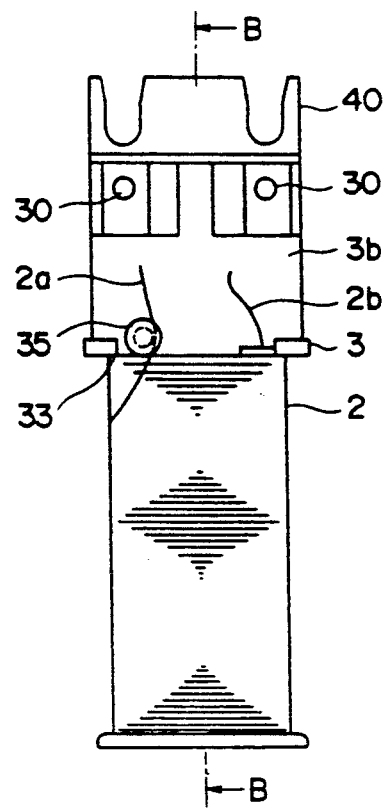
FIG. 10 is a side view of an essential portion of the pulse generator of FIG. 9.
Figure 11:
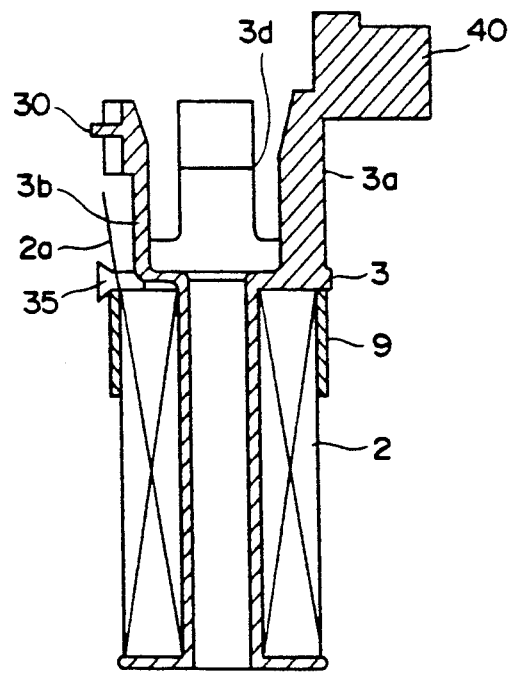
FIG. 11 is a sectional view taken along the line B—B of FIG. 10.

FIG. 9 is a sectional veiw showing the structure of a pulse generator according to another embodiment of this invention, and FIG. 10 is a partial enlarged view of the pulse generator and FIG. 11 is a sectional view taken along the line B—B of FIG. 10. In the pulse generator of this embodiment, a columnar small protrusion 35 is integrally formed with the bobbin 3 at an edge of a flange 31 at the root of the leg portion 3b, which has a larger head in diameter than any other portion and protrudes in the radial direction of the bobbin 3. The last end 2a of the coil 2 is wound around the small protrusion 35 maintaining the winding tension. A starting end of the coil 2 is pressed down by the coil 2 wound thereover.

The structure of other elements in the pulse generator is the same as in the former embodiment shown in FIG. 3, and accordingly the same or corresponding parts are designated by the same reference numerals.

According to this latter embodiment, because the end portion of the coil 2 around the bobbin 3 is twined around the small protrusion 35 formed on the flange of the body of the bobbin 3, it is not rubbed with an edge 33 of the bobbin 3 by vibrations which results in cutoffs of the coil 2. Moreover, because the coil 2 wound around the bobbin 3 can be twined round the small protrusion 35 with the winding tension maintained, the coil 2 never slackens, thereby making it easy to bandage the coil 2 with the tape 9.

Figure 12:
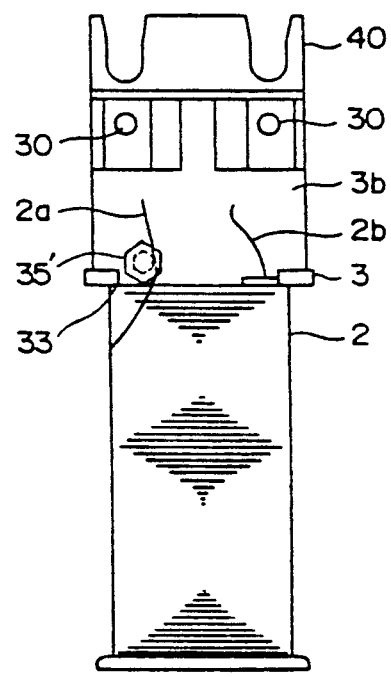
FIG. 12 is a side view of the pulse generator of FIG. 9 illustrating a polygonal prism shaped protrusion.

Although the foregoing description is directed to the columnar protrusion 35, the shape of the protrusion is not limited to a cylinder, but may be a polygonal prism as shown in FIG. 12.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A pulse generator comprising:
a magnetic core;
a coil electromagnetically coupled with said magnetic core, having a linking portion at an end thereof for linking to another member, said coil for generating pulse voltages according to a change in the distance between an object to be detected and a magnetic field formed by said core and coil;
a lead member for leading pulse voltages generated by said coil to an external device;
a connecting member, for electrically connecting said coil with said lead member, wherein a first portion is fixed to an end of said linking portion of said coil, a second portion is entwined with the remainder of said linking portion to relieve stress on said first portion, and a third portion is fixed to said lead member; and
a reinforcing material provided at said second portion of said connecting member for reinforcing the bending strength of said second portion, and wherein the area between said first and second portions of said connecting member is wider than said first portion.

2. A pulse generator comprising:
a magnetic core;
a coil electromagnetically coupled with said magnetic core, with a linking portion at an end thereof for linking to another member, said coil for generating pulse voltages according to a change in the distance between an object to be detected and a magnetic field formed by said core and coil;
a bobbin having a flange at least at one end thereof, said flange being provided with a protrusion at the edge thereof around which is twined said linking portion of said coil;
a lead member for leading pulse voltages generated by said coil to an external device; and
a connecting member, for electrically connecting said coil with said lead member, said connecting member having one end portion coupled to said coil and another end portion coupled to said lead member.

3. A pulse generator as set forth in claim 2, wherein said protrusion on said bobbin is columnar.

4. A pulse generator as set forth in claim 3, wherein a head of said protrusion has a larger diameter than a remaining portion of said protrusion.

* * * * *